May 12, 1925.

F. L. NAPIER ET AL

DISTRIBUTING TRUCK

Filed Oct. 13, 1919

Inventors
N.W. Napier:
F.L. Napier:
BY
Arthur H. Durand
ATTORNEY

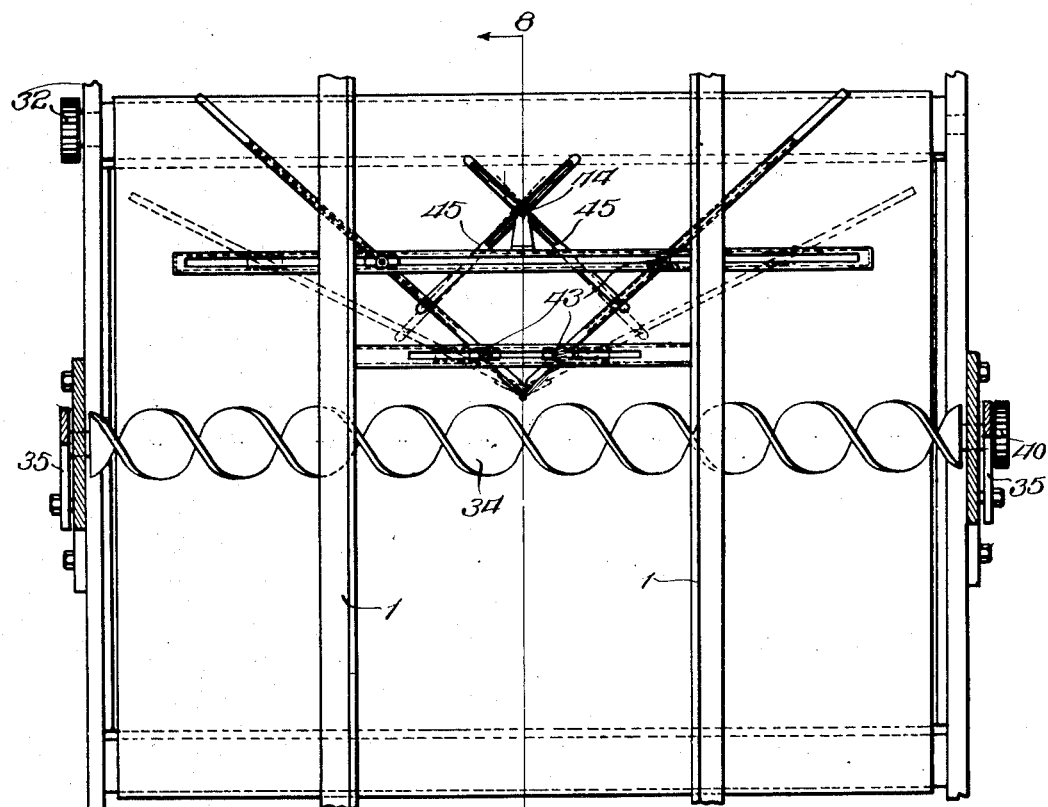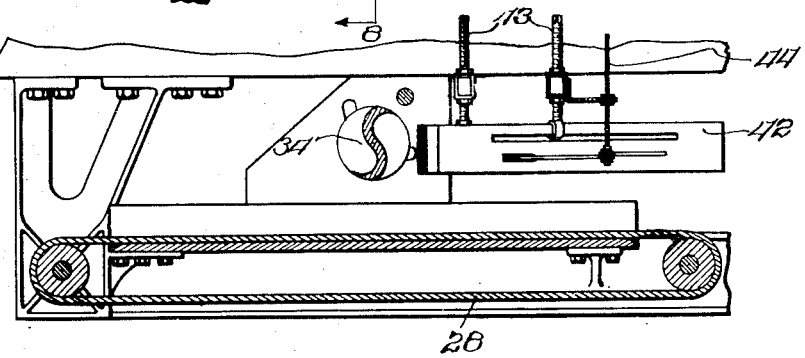

Patented May 12, 1925.

1,537,181

UNITED STATES PATENT OFFICE.

FRANK L. NAPIER, OF ST. JOSEPH, AND NELSON W. NAPIER, OF BENTON HARBOR, MICHIGAN.

DISTRIBUTING TRUCK.

Application filed October 13, 1919. Serial No. 330,334.

*To all whom it may concern:*

Be it known that we, FRANK L. NAPIER and NELSON W. NAPIER, citizens of the United States of America, and residents of St. Joseph and Benton Harbor, Michigan, respectively, have invented a certain new and useful Improvement in Distributing Trucks, of which the following is a specification.

This invention relates to machines for spreading materials on a road, as in putting down paving, or for repairing roads and filling up ruts, and other similar purposes.

The features of construction constituting the present invention are in the nature of an improvement on the machine shown and described in application Serial Number 169,652, filed May 19, 1917, for distributing trucks.

Objects of the invention hereinafter described are to provide improved and more efficient means for feeding the materials from the hopper body to the conveyer belt; to provide an improved construction and arrangement whereby both the hopper body and the lower conveyer belt can be removed to render the machine suitable for use as an ordinary motor truck; to provide means for dividing the materials into two streams, so to speak, one at each side of the machine, so that ruts in a road can be filled by discharging the materials in this manner, instead of by spreading the materials uniformly over the surface of the road; and to provide certain details and features of construction tending to increase the general efficiency and the desirability of a spreading or distributing machine of this particular character.

To the foregoing and other useful ends the invention consists in matters hereinafter set forth and claimed and shown in the accompanying drawings, in which—

Fig. 7 is an enlarged sectional plan view showing a modification.

Fig. 8 is a vertical longitudinal section on line 8—8 in Fig. 7.

Figure 1:
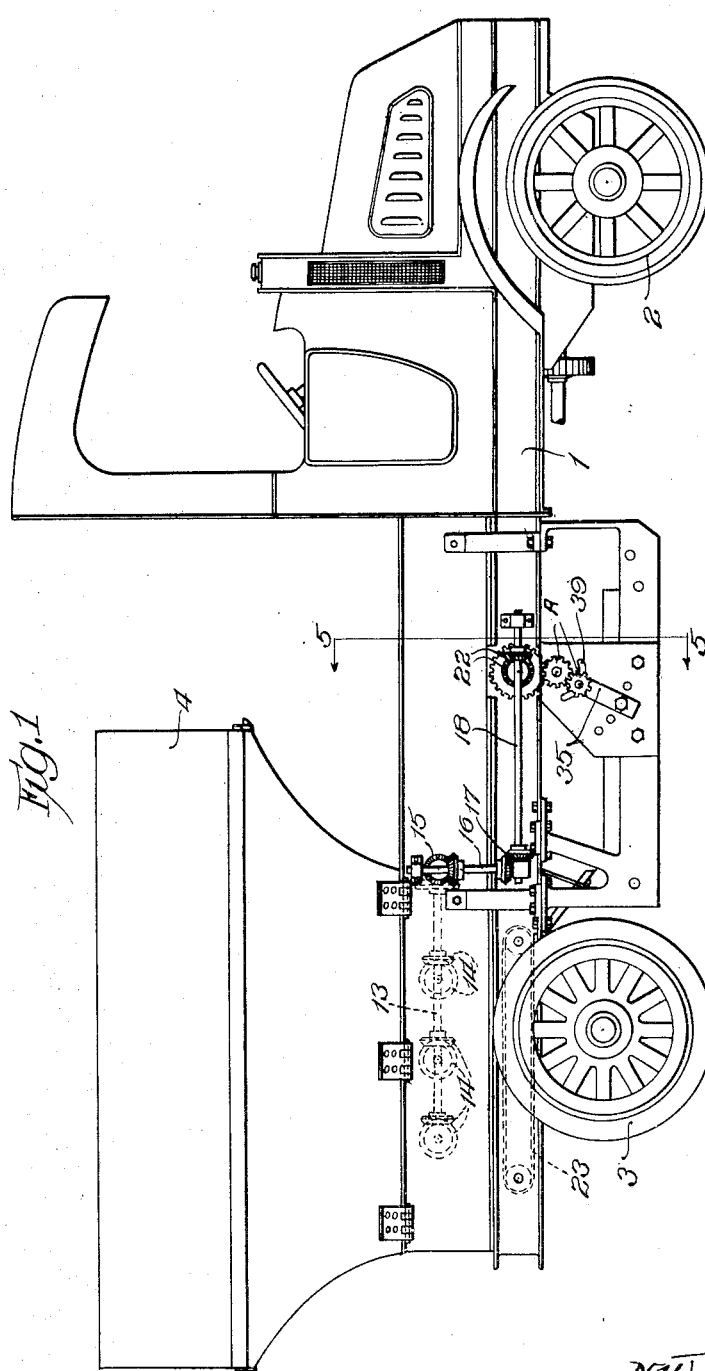
Fig. 1 is a side elevation of a spreading or distributing machine embodying the principles of the invention.
Figure 2:
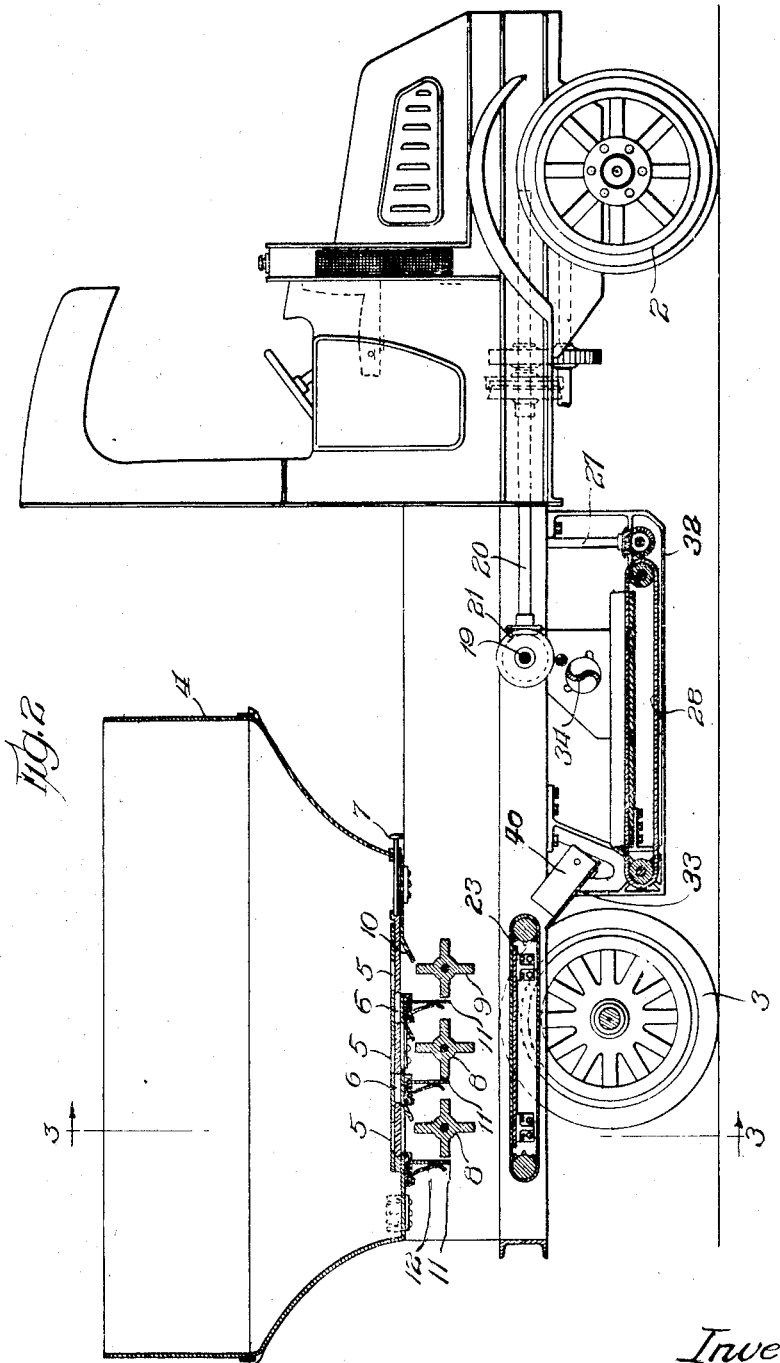
Fig. 2 is a longitudinal section of said machine, viewed from the other side.
Figure 3:
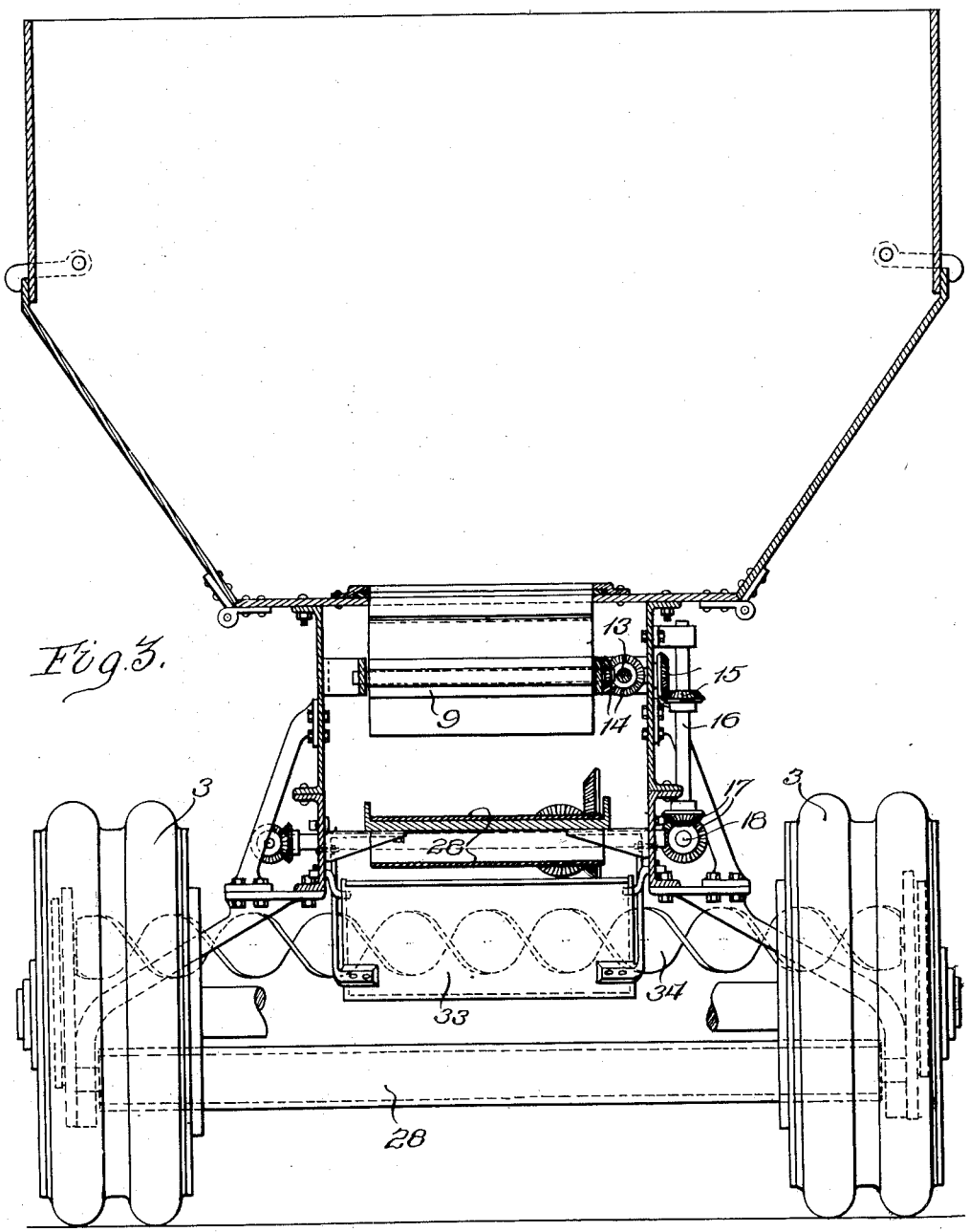
Fig. 3 is an enlarged transverse vertical section on line 3—3 in Fig. 2.
Figure 4:
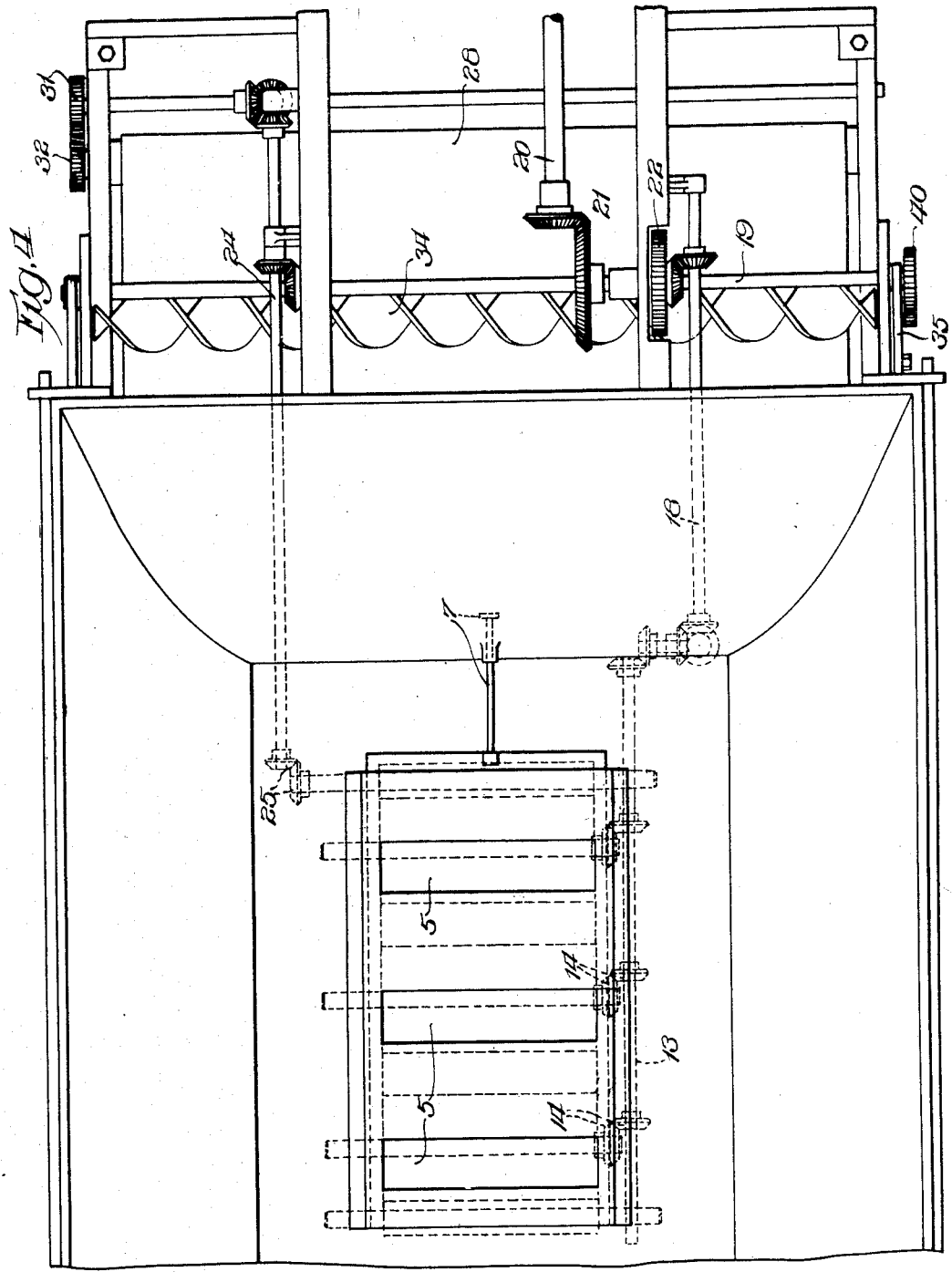
Fig. 4 is an enlarged plan view of a portion of said machine.
Figure 5:
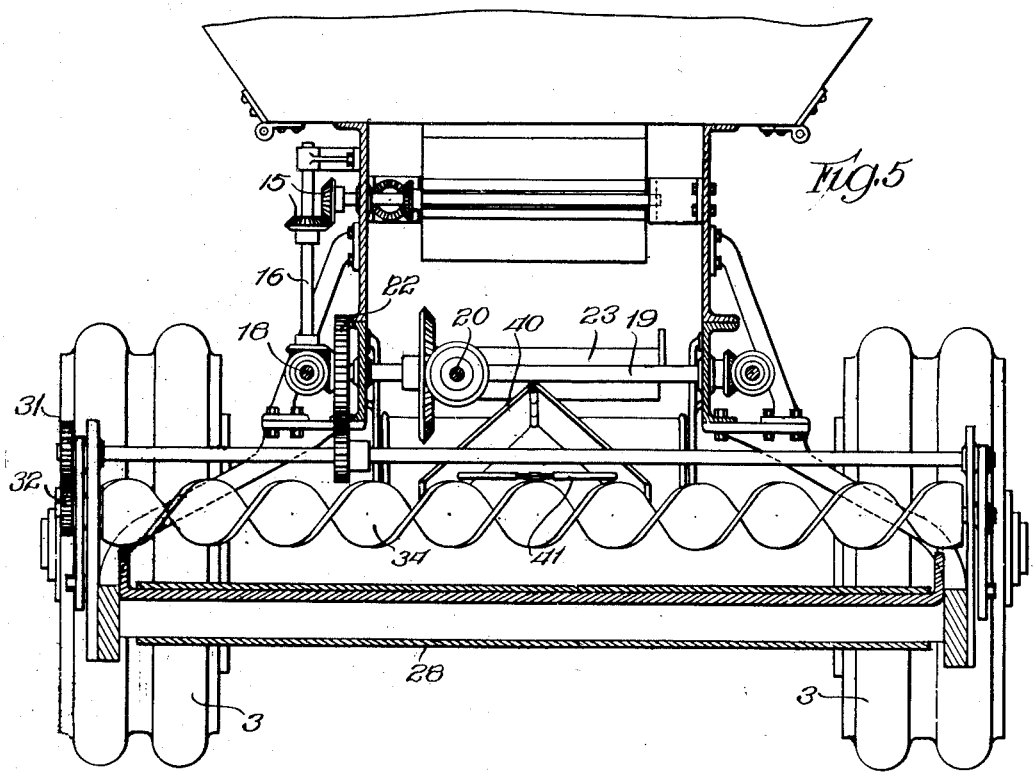
Fig. 5 is an enlarged transverse vertical section on line 5—5 in Fig. 1.
Figure 6:
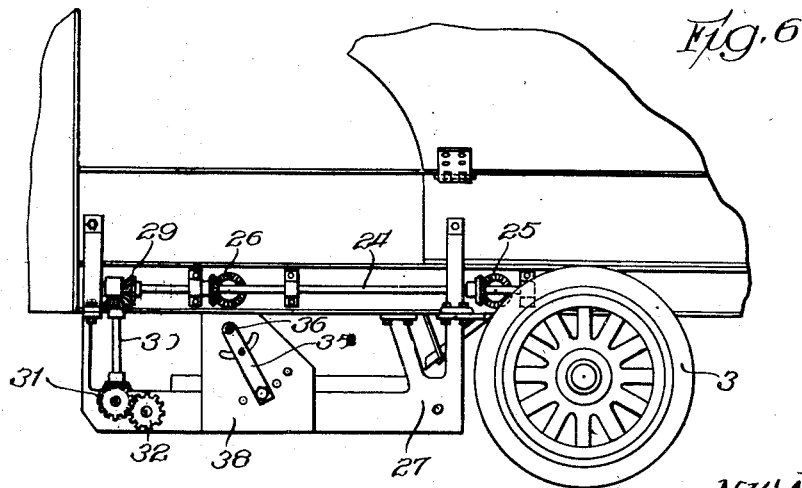
Fig. 6 is a side elevation of a portion of the machine shown in Fig. 1, but viewed from the opposite direction.

As thus illustrated, the invention comprises a chassis 1 of any suitable character, such as those employed in ordinary motor trucks, having front and rear wheels 2 and 3, the latter being driven through any suitable power transmitting connection. The hopper body 4 is removably mounted on the chassis in any suitable or desired manner, so that this body together with the feed mechanism in the bottom thereof can be removed when it is desired to use the machine as an ordinary motor truck. Said feed mechanism comprises a bottom provided with transverse slots 5, of any suitable number, three being shown as illustrative of the invention. This plate is provided with slots 6 to register with two of the slots 5 when the plate is pulled forward by the handle or other device 7, and the rear edge of the plate will then pass below the other slot 5, so that all three of the slots 5 will then be open; and by gradually or partially sliding the plate backward, the feed slots 5 will be partially closed, and in this way the discharging of the materials from the hopper body can be controlled at will. Below each discharge slot there is a rotary feeder 8 having blades 9 forming pockets between them, so that the materials will be discharged in measured quantities. A lip 10 is disposed below each discharge slot 5, to barely contact with the edges of the blades 9, and swinging check plates 11, held normally and yieldingly in position by springs 12, are disposed at the other sides of said discharge slots to barely engage the edges of the blades 9, and with this arrangement the materials will not be discharged except when the feeders 8 are rotating. Should the materials become clogged or jammed, the plates 11 will yield, to allow the materials to pass, thus preventing breakage, and the springs 12 will then return the plates to normal position. The rotary feeders 8 are driven from a longitudinal shaft 13, through the medium of bevel gearing 14, so that the three feeders rotate in unison. The shaft 13 is connected by bevel gearing 15 with the vertical shaft 16, and the latter is connected by bevel gearing 17 with the longitudinal shaft 18, these shafts being supported in suitable bearings on the chassis of the machine. A transverse shaft 19 is driven from the engine of the machine through the shaft 20 through the medium of bevel gearing 21, and the shaft 19 is connected by bevel gearing 22 with the shaft 18 previously mentioned, whereby the rotary feeders 8 are driven by power derived from the engine or motor, of any usual or ordinary character, at the forward end of the machine.

Means for delivering and spreading the materials on the ground are as follows: A belt conveyer 23 is suitably mounted below the rotary feeders 8, and is driven from the longitudinal shaft 24 through the medium of bevel gearing 25, the shaft 24 being connected by bevel gearing 26 with the shaft 19 previously mentioned. A supplemental frame, preferably in the form of a casting or structural iron frame 27, is removably bolted to the bottom of the chassis, so that it hangs between the front and rear wheels of the machine. Upon this removable frame 27 is suitably mounted a conveyer belt 28, the latter being driven from the shaft 24 through the bevel gearing 29, vertical shaft 30, bevel gearing 31, and spur gearing 32, whereby said belt conveyer is driven at the desired speed. The belts 23 and 28 are both driven in a direction to discharge the materials from their forward ends, and an incline 33 is provided to deliver the materials from the belt 23 to the upper surface of the belt 28, in a manner that will be readily understood. A spreader, preferably in the form of a screw or spiral 34, is preferably mounted above the belt 28, on pivoted arms 35, the latter being pivoted at 36, and being adjustable to different positions by means of the holes 37 in the side plates 38 on the frame 27, so that the spreader can be moved toward and away from the belt. The shaft of the spreader 34 is movable in the curved slots 39 of said side plates 38, and is connected with the shaft 19 through spur gearing A or any suitable means and with this arrangement the materials are flattened out on the belt 28, causing a wide sheet of materials of predetermined thickness to be delivered upon the ground from the forward end of the belt 28 while the machine is moving forward at the desired speed. Thus when the removable frame 27 is secured in place, the spur gearing 40 is thereby automatically connected to transmit power from the engine or motor to the spreader 34. The vertical shaft 30 is detachable at its upper and lower ends, so that when the frame 27 is removed the power transmitting connection to the belt 28 will be opened or disconnected, and when the frame 27 is attached in place the shaft 30 is adjusted in position to close the said power transmitting connection and render it operative to drive the belt.

Therefore, as stated, the machine can be used as an ordinary motor truck, and for this purpose both the hopper body 4 and the supplemental frame 27 are readily removable, being bolted to the chassis in any suitable or desired manner.

For some purposes it is desirable that the materials be delivered from the belt 23 in two parallel streams, so to speak, so that the materials will be divided into portions which will fall into the deep ruts of a road, when it is desired to fill the latter, instead of spreading the materials uniformly over the surface of the road. For this purpose a V-shaped divider 40 is provided on the incline 33, with its apex pointed toward the rear end of the belt 23, so that the materials will be separated or divided into two quantities, thereby causing two streams to flow down the incline to the belt 28, each stream being in line with one of the rear wheels 3 of the machine. Means of any suitable character, such as the device 41, can be provided for moving the sides of the divider 40 toward and away from each other, thereby to vary the distance between the two streams of materials, when such is necessary or desirable. The divider or spreader 40 can be held in place by any suitable means, so that it can be removed when its action is not needed, and when it is desired to spread the materials uniformly over the surface of the road.

In Figs. 7 and 8 a modification of said divider is shown as follows: The V-shaped divider 42 is disposed over the belt 28, and supported by vertically disposed screw adjusting devices 43, and when lowered by these devices the divider will cause the materials on the belt 28 to be separated or divided into two streams, so that one stream will fall from the belt at one side thereof and the other stream at the other side, thus pouring the materials in two streams into the deep ruts of the road which is being repaired. The distance between the sides of the divider 42 can be varied by rotating the screw 44, so as to loosen the two members 45 which are clamped together by this screw, thereby permitting the hinged sides of the divider 42 to be swung toward or away from each other. Retightening the screw 44 will then clamp the members 45 together, and thus hold the divider in adjusted position. When it is not desired to use the divider, the screws 43 are rotated to raise the device, a distance above the belt 28, sufficiently to permit the materials to pass unimpeded below.

From the foregoing it will be seen that the discharge of the materials from the belt 23 can be controlled at will, and so regulated that the feeding action to the spreading belt will be of the required character, and with the machine driven at the requisite speed the materials will be spread like a sheet on the ground, or on the surface of the road, and the said sheet will be of predetermined thickness. When desired, the materials can be divided into two streams to fill up the deep ruts in a roadway, and when this is done the divider can then be removed or raised to permit the materials to be discharged evenly over the entire surface of the roadway. Moreover, both the hopper body and the suspended spreader belt can be removed to render the machine suitable for use as an ordinary motor truck.

The rotary feed devices 8 in the bottom of the hopper serve to distribute the materials over a considerable area of the belt 23, and to thus perform the initial spreading of the materials to produce the sheet or layer of predetermined thickness.

What we claim as our invention is:—

1. In a distributing truck adapted for spreading loose paving materials in a sheet or layer on the ground, the combination of a hopper for the materials, instrumentalities disposed below the plane of the hopper and having means to spread the loose materials in a horizontally disposed flat sheet and operative to carry and gradually feed said sheet by continuous motion thereof to the surface of the ground, while the truck is travelling along the street, including at least one forwardly travelling belt for supporting said sheet of materials, so that the sheet travels forward faster than the truck, feed mechanism in the bottom of said hopper to discharge the materials at different points longitudinally thereof to spread them over said belt, and means to operate said belt.

2. A machine for carrying a quantity of loose materials, and for continuously forming the materials into a flat sheet prior to the discharge thereof onto the ground, comprising a horizontally disposed movable support, means including feeding devices which discharge the materials downward and which are disposed at intervals longitudinally of the machine to spread the materials over a wide area and adapted to form the loose materials into a flat sheet on said support, means to operate said support relatively to the machine to carry the sheet along in the plane thereof, and means whereby the entire machine travels forward for the purpose of laying the sheet on the ground.

3. In a distributing truck adapted for spreading loose paving materials in a sheet or layer on the ground, the combination of a hopper for the materials, instrumentalities disposed below the plane of the hopper and having means to spread the loose materials in a horizontally disposed flat sheet and operative to carry and gradually feed said sheet by continuous motion thereof to the surface of the ground, while the truck is travelling along the street, including at least one forwardly travelling belt for supporting said sheet of materials, so that the sheet travels forward faster than the truck, a supplemental frame hung from the truck to support said belt, means whereby both the hopper and the supplemental frame are removable when it is desired to use the truck for ordinary purposes, and means including separable power transmitting connections to operate said belt and permit said removal of the supplemental frame.

4. A machine for carrying a quantity of loose materials, and for continuously forming the materials into a flat sheet prior to the discharge thereof onto the ground, comprising a horizontally disposed movable support, means adapted to form the loose materials into a flat sheet on said support, means to operate said support relatively to the machine to carry the sheet along in the plane thereof, means whereby the entire machine travels forward for the purpose of laying the sheet on the ground, and means whereby said movable support and said sheet forming means are readily removable when it is desired to use the truck for ordinary purposes.

5. In a distributing truck adapted for spreading loose paving materials in a sheet or layer on the ground, the combination of a hopper for the materials, instrumentalities disposed below the plane of the hopper and having means to spread the loose materials in a horizontally disposed flat sheet and operative to carry and gradually feed said sheet by continuous motion thereof to the surface of the ground, while the truck is traveling along the street, including at least one forwardly traveling belt for supporting said sheet of materials, so that the sheet travels forward faster than the truck, means whereby the sheet is divided into two parallel streams when it is desired to fill ruts in the road, and means to operate said belt.

6. A machine for carrying a quantity of loose materials, and for continuously forming the materials into a flat sheet prior to the discharge thereof onto the ground, comprising a horizontally disposed movable support, means adapted to form the loose materials into a flat sheet on said support, means whereby to divide the sheet into parallel streams when such is desired, means to operate said support relatively to the machine to carry the sheet along the plane thereof, and means whereby the entire machine travels forward for the purpose of laying the sheet on the ground.

FRANK L. NAPIER.
NELSON W. NAPIER.